United States Patent [19]

Gnant

[11] 4,280,536
[45] Jul. 28, 1981

[54] CONNECTING DEVICE FOR INSULATED DUCT WORK

[76] Inventor: Erich Gnant, 745 Janacek Dr., Waukesha, Wis. 53186

[21] Appl. No.: 37,416

[22] Filed: May 9, 1979

Related U.S. Application Data

[63] Continuation-in-part of Ser. No. 927,861, Aug. 23, 1978, abandoned.

[51] Int. Cl.³ ............................................. F16L 59/02
[52] U.S. Cl. ................................... 138/149; 138/147; 138/151; 138/159; 138/167
[58] Field of Search ............... 285/586, 587, 277, 278, 285/281, 282, 287, 242, 716, 461; 138/147, 149, 156, 157, 158, 159, 167, 151

[56] References Cited

U.S. PATENT DOCUMENTS

| 795,839 | 8/1905 | Kelsey | 138/158 |
|---|---|---|---|
| 975,692 | 11/1910 | Jeffers | 138/157 |
| 2,134,919 | 11/1938 | Horster | 138/DIG. 4 |
| 2,489,048 | 11/1949 | Rinehart | 138/149 X |
| 3,095,014 | 6/1963 | Dosker | 138/149 X |
| 3,331,305 | 7/1967 | Oneson | 138/158 X |
| 3,416,275 | 12/1968 | Loghem et al. | 52/586 X |
| 3,687,168 | 8/1972 | Sherman et al. | 138/DIG. 4 |
| 3,974,616 | 8/1976 | Beckley | 52/282 X |
| 4,126,978 | 11/1978 | Heller | 52/586 X |
| 4,128,983 | 12/1978 | Matsubara | 52/461 |

FOREIGN PATENT DOCUMENTS 1311988  11/1962  France ........................................ 52/282

Primary Examiner—James E. Bryant, III
Attorney, Agent, or Firm—Andrus, Sceales, Starke & Sawall

[57] ABSTRACT

A connector is used to join sheets of fibrous insulation into a duct. The connector includes a base plate to which a plurality of guide flanges and penetrating flanges are connected. The penetrating flanges are spaced from and parallel to the guide flanges, and both the penetrating and guide flanges project from the base plate. In use, the guide flanges bear against the outer surface of the insulating sheet while the knife-like edges of the penetrating flanges penetrate and mesh with the longitudinal fibers of the insulation.

1 Claim, 6 Drawing Figures

U.S. Patent
Jul. 28, 1981
4,280,536
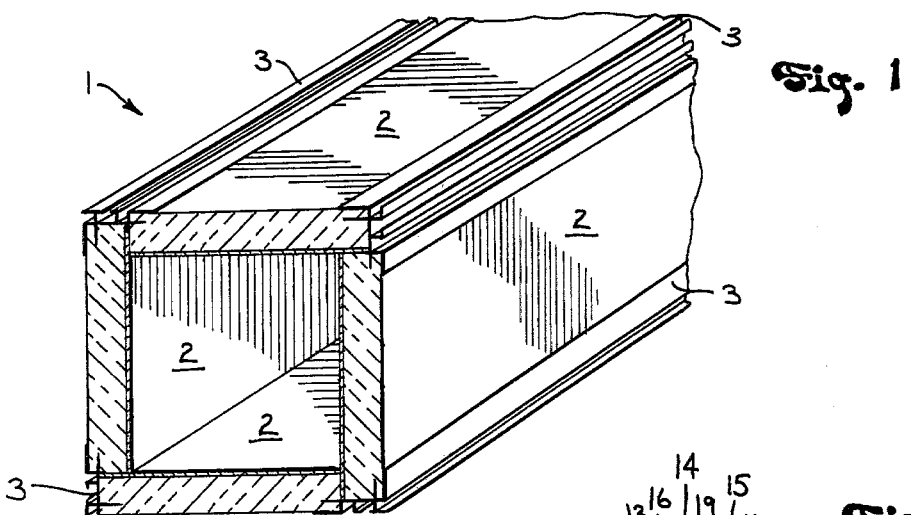
Fig. 1
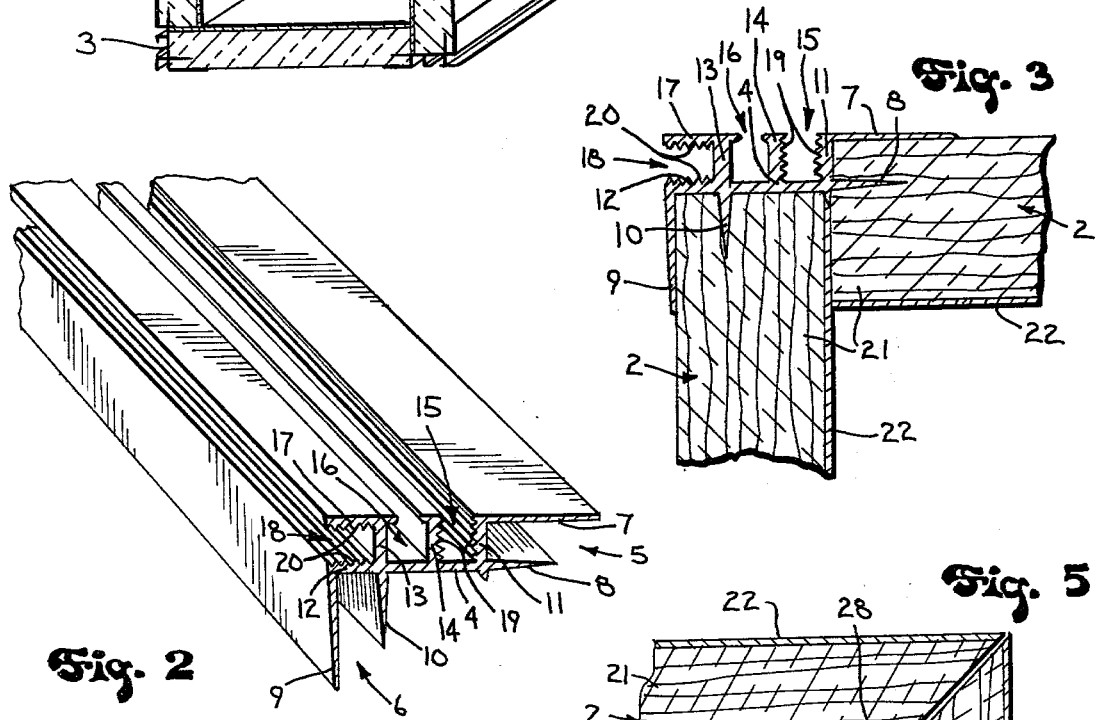
Fig. 2
Fig. 3
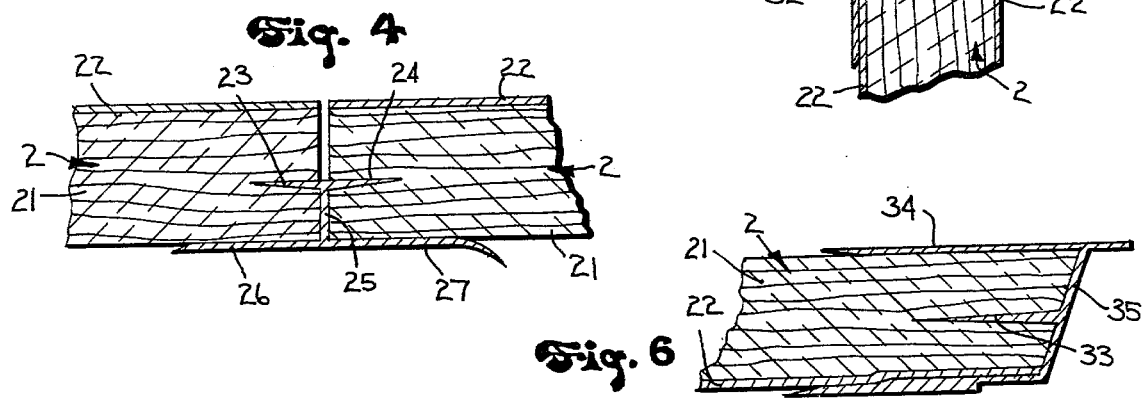
Fig. 4
Fig. 5
Fig. 6

CONNECTING DEVICE FOR INSULATED DUCT WORK

This is a continuation-in-part application of application Ser. No. 927,861 filed Aug. 23, 1978, now abandoned.

BACKGROUND OF THE INVENTION

The present invention relates to duct work connectors and particularly to a device for joining sheets of insulating material so as to provide a fluid conducting duct.

The conventional insulated air transport ducts are formed from a sheet of insulating material which is four feet wide, ten feet long and approximately one and one-eighth inches thick. Typically a thin layer of reflective material such as aluminum foil is attached to one side of the sheet of insulating material. The sheet is then mitred, notched or grooved so as to produce a series of three cuts which run the entire length of the sheet and are spaced at one foot intervals across the width of the sheet. The depth of the cuts is adjusted so as to cut through substantially all of the insulating material while leaving the foil covering layer intact. Once the cuts have been made, the sheet may be folded into a square duct which is one square foot in cross sectional area and has the aluminum foil layer on the outside. The duct is then stapled and taped at the corners in order to retain the duct configuration and to preserve the insulating properties of the duct. Obviously wider sheets of insulating material can be used so as to make ducts of larger cross sectional area.

Fabrication of the duct in the foregoing conventional manner exhibits several shortcomings. First, assembly requires precise on-the-job measurements and the use of special tools and accessories.

Second, conventionally assembled duct work also requires reinforcement channels or plates in order to give the duct work sufficient support for suspension from overhead structural members. The foregoing factors increase the cost and installation time of the duct.

Third, the conventional duct has the aluminum foil layer on the outside with the fibrous insulating material forming the inner surface of the duct. The constant and/or rapid passage of air over this surface may cause the release of minute particles of insulation material into the air stream causing a potential health hazard.

Finally, even when the corner formations of the conventional duct work are securely stapled and carefully taped, the duct work is far from air tight. Heated air tends to cool in its passage through the duct and in air conditioning systems, cooled air tends to warm lessening thermal efficiencies.

SUMMARY OF THE INVENTION

A device for joining sheets of insulating material includes a plurality of guide flanges connected to and extending from a base plate. A plurality of penetrating flanges are connected to the base plate, spaced from and parallel to the guide flanges.

In use the device joins two sheets of insulating material at a pre-selected angle. The penetrating flanges of the device penetrate and mesh with the longitudinal fibers of the insulating material, while the guide flanges bear against the outer surface of the insulating sheet thereby securing the insulation to the device. Four of the connectors are used to provide the four corners of a duct assembled from four sheets of insulation.

The invention provides an insulating duct which can be quickly and efficiently fabricated and which eliminates the need for precise measurements or special tools and accessories. The duct has sufficient rigidity so that auxiliary structural reinforcement is not required.

Since the device can be applied to insulating sheets with either side of the sheet facing outwardly, it is possible to construct duct work with the aluminum foil layer on the inside of the duct, thereby eliminating the potential health hazard present when the fibrous insulation is exposed to moving air.

The meshing of the device's penetrating flanges with the insulation results in a much improved air seal which allows for the transfer of treated air over long distances without appreciable temperature variation.

BRIEF DESCRIPTION OF THE DRAWING

FIG. 1 is a perspective view of a duct fabricated in accordance with the present invention;

FIG. 2 is a perspective view of the connecting device;

FIG. 3 is a view of the duct taken along the line 3—3 of FIG. 1;

FIG. 4 is a sectional view of another embodiment of the invention as applied to two sheets of insulation;

FIG. 5 is a sectional view of another embodiment of the invention as applied to two sheets of insulation;

FIG. 6 is a side view of another embodiment of the invention as used with a single sheet of insulation.

DESCRIPTION OF THE PREFERRED EMBODIMENT

FIG. 1 shows a duct 1 constructed in accordance with the invention. The duct 1 consists of fibrous insulating walls 2 joined at the corners by the elongated connectors 3.

FIGS. 2 and 3 show one embodiment of the connector 3 in detail. The connector 3 consists of a base plate 4 having first and second sheet engaging members 5 and 6. The sheet engaging member 5 consists of two parallel spaced flanges 7 and 8 between which a portion of insulating sheet 2 is wedged for retention. Similarly, parallel spaced flanges 9 and 10 comprise sheet engaging member 6.

Flanges 7 and 9 serve as guide flanges which lie on the exterior of insulating sheet 2, as best shown in FIG. 3, while flanges 8 and 10 have sharpened outer edges and serve as penetrating flanges which are inserted into the insulating sheet 2.

Sheet engaging member 5 has guide flanges 7 mounted on wall 11 of base plate 4, while the penetrating flange 8 is an extension of base plate 4.

Sheet engaging member 6 is at a right angle to sheet engaging member 5 and has guide flange 9 mounted to an extension 12 of base plate 4, while the penetrating flange 10 is perpendicularly mounted to the base plate 4 opposite base plate wall 13.

Base plate wall 14 is intermediate walls 11 and 13 and cooperates with walls 11 and 13 to form channels 15 and 16.

Channel forming wall 17 is normally connected to wall 13 and cooperates with base plate extension 12 to form channel 18. Channels 15, 16 and 18 serve as receptacles for guides, interlock bars or low voltage wiring running along the length of the duct.

The surfaces of walls 11 and 14 which define the side walls of channel 15 are grooved or notched, as indicated by 19. The grooves 19 are parallel to and run the entire length of channel 15.

The surfaces of channel forming piece 17 and base extension 12 which define the side walls of channel 18 are similarly grooved. The grooves 20 are parallel to and run the entire length of channel 18.

In the assembly of a duct as shown in FIGS. 1 and 3 the connector 3 joins two sheets of insulation 2 at a right angle. The insulating sheet 2 consists of a thick fibrous layer 21 to which a thin layer of aluminum foil 22 has been applied. Guide flange 7 bears against the outer surface of the insulating sheet, while the knife-like edge of the penetrating flange 8 is forced into and meshes with the longitudinal fibers of the insulating sheet 2 thus providing a highly efficient seal.

Similarly, a second sheet of insulation is aligned with guide flange 9 and forced down onto penetrating flange 10. p The process is repeated with three more connecting devices so as to form square duct work 1. The use of the device 3 allows for the fabrication of duct 1 which has the aluminum foil layer 22 on the inside of the duct.

Grooved channels 15 and 18 can accept threaded bolts which contain metal support hangers needed for suspending the duct work 1 from overhead structures.

Channel portions 15, 16 and 18 may also be used to contain guides for aligning sections of duct work 1 and/or interlock bars for securely joining sections of duct work 1. The channels 15, 16 and 18 may also serve as guides or containments for low voltage wiring running along the length of the duct work.

In the alternate embodiment of FIG. 4 the penetrating flanges 23 and 24 extend from base plate 25 in opposite directions, as do the guide flanges 26 and 27. This configuration allows for the splicing of duct work 1 in a longitudinal direction.

In the alternate embodiment of FIG. 5 the penetrating flanges 28 and 29 meet at the base plate 30 at a right angle as do the guide flanges 31 and 32. This configuration allows for the right angle splicing of duct work 1.

The alternate embodiment of FIG. 6 consists of a sngle penetrating flange 33 and a single guide flange 34 attached to base plate 35. This embodiment acts as a door jamb and frame for an access door into the duct work 1.

Various modes of carrying out the invention are contemplated as being within the scope of the following claims particularly pointing out and distinctly claiming the subject matter which is regarded as the invention.

I claim:

1. An insulating duct comprising:
a first sheet of fibrous insulating material having a first substantially smooth end surface;
a second sheet of fibrous insulating material and having a second substantially smooth end surface; and
a connector engaging said first and second sheets and joining said first and second sheets at a substantially right angle, said connector comprising:
a base extending substantially the entire length of insulating material;
a first sheet engaging means integrally connected to said base and comprising:
a first guide flange disposed in engagement with the outer surface of said first sheet; and
a first penetrating flange parallel to and spaced from said first guide flange and having a sharpened edge embedded within the first end surface of said first sheet, said first penetrating flange extending substantially the entire length of said base; and
a second sheet engaging means connected to said base and comprising;
a second guide flange disposed in engagement with the outer surface of said second sheet; and
a second penetrating flange parallel to and spaced from said second guide flange and having a sharpened edge embedded within the second end surface of said second sheet, said second penetrating flange extending substantially the entire length of said base.

* * * * *